United States Patent
Hupfield et al.

(10) Patent No.: US 8,399,591 B2
(45) Date of Patent: Mar. 19, 2013

(54) AMINO-MERCAPTO FUNCTIONAL ORGANOPOLYSILOXANES

(75) Inventors: Peter Hupfield, Trevaughan (GB); Avril Surgenor, Cardiff (GB)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/184,688

(22) Filed: Jul. 18, 2011

(65) Prior Publication Data

US 2011/0275769 A1    Nov. 10, 2011

Related U.S. Application Data

(62) Division of application No. 11/918,308, filed as application No. PCT/US2006/017703 on May 8, 2006, now Pat. No. 8,003,746.

(60) Provisional application No. 60/679,150, filed on May 9, 2005, provisional application No. 60/793,482, filed on Apr. 20, 2006.

(51) Int. Cl.
*C08G 77/26* (2006.01)
(52) U.S. Cl. ............................................. 528/30
(58) Field of Classification Search .......... 528/30, 528/38; 556/425, 426; 106/287.11
See application file for complete search history.

(56) References Cited

U.S. PATENT DOCUMENTS

| | | | |
|---|---|---|---|
| 3,160,601 A | 12/1964 | Hyde et al. | |
| 4,448,810 A | 5/1984 | Westall | |
| 4,810,766 A | 3/1989 | Ohmori et al. | |
| 4,972,037 A | 11/1990 | Garbe et al. | |
| 4,986,630 A | 1/1991 | Herbrechtsmeier et al. | |
| 4,987,180 A | 1/1991 | Ohata et al. | |
| 4,999,413 A | 3/1991 | Panster et al. | |
| 5,093,451 A | 3/1992 | Panster et al. | |
| 5,164,522 A | 11/1992 | McCarthy et al. | |
| 5,209,924 A | 5/1993 | Garbe et al. | |
| 5,235,013 A | 8/1993 | Ito et al. | |
| 5,260,400 A | 11/1993 | Karydas | |
| 5,344,906 A | 9/1994 | Westall | |
| 5,352,817 A | 10/1994 | McCarthy et al. | |
| 5,525,660 A * | 6/1996 | Shiono et al. | 524/268 |
| 5,824,814 A | 10/1998 | Cray et al. | |
| 6,294,007 B1 | 9/2001 | Martin | |
| 7,291,399 B2 | 11/2007 | Kaplan et al. | |
| 2002/0132952 A1 | 9/2002 | Miyadai et al. | |
| 2009/0165913 A1 | 7/2009 | Hergenrother et al. | |

FOREIGN PATENT DOCUMENTS

| | | |
|---|---|---|
| EP | 0994134 | 4/2000 |
| EP | 1652901 | 5/2006 |
| JP | 60138546 | 7/1985 |
| JP | 60243167 | 12/1985 |
| JP | 62038419 | 2/1987 |
| JP | 63243110 | 10/1988 |
| JP | 3190951 | 8/1991 |
| JP | 3215544 | 9/1991 |
| JP | 4045170 | 2/1992 |
| JP | 5025428 | 2/1993 |
| JP | 5262846 | 10/1993 |
| JP | 8073805 | 3/1996 |
| JP | 08127584 | 5/1996 |
| JP | 8319397 | 12/1996 |
| JP | 2000313709 | 11/2000 |
| WO | 0146505 | 6/2001 |
| WO | 2005040250 | 5/2005 |

* cited by examiner

*Primary Examiner* — Margaret Moore
(74) *Attorney, Agent, or Firm* — Alan Zombeck

(57) ABSTRACT

An organopolysiloxane containing both an amino functional organic group and a mercapto functional organic group is disclosed. A method of making such amino-mercapto functional organopolysiloxanes is by reacting (A) a silanol-functional polysiloxane, (B) an amino functional alkoxy silane, and (C) a mercapto functional alkoxy silane, via a condensation reaction. The amino-mercapto functional organopolysiloxanes products are useful in textile and fabric treatments.

6 Claims, No Drawings

AMINO-MERCAPTO FUNCTIONAL ORGANOPOLYSILOXANES

CROSS REFERENCE TO RELATED APPLICATIONS

This is a U.S. divisional application of U.S. patent application Ser. No. 11/918,308 filed on 10 Oct. 2007 which issued on 23 Aug. 2011 as U.S. Pat. No. 8,003,746. U.S. patent application Ser. No. 11/918,308 was a national stage filing under 35 U.S.C. §371 of PCT Application No. PCT/US06/017703 filed on 8 May 2006 which claimed the benefit of U.S. Provisional Patent Application No. 60/679,150 filed 9 May 2005 and U.S. Provisional Patent Application No. 60/793,482 filed 20 Apr. 2006 under 35 U.S.C. §119(e).

TECHNICAL FIELD

This invention relates to an organopolysiloxane containing both an amino functional organic group and a mercapto functional organic group. The invention further relates a method of making such amino-mercapto functional organopolysiloxanes by reacting (A) a silanol-functional polysiloxane, (B) an amino functional alkoxy silane, and (C) a mercapto functional alkoxy silane, via a condensation reaction. The amino-mercapto functional organopolysiloxanes products are useful in textile and fabric treatments.

BACKGROUND

Amino-functional polysiloxanes are widely used in the textile industry as fibre lubricants and as fabric softeners and anti-wrinkle agents, and are also used in the personal care industry as hair conditioners and in skin care compositions. Mercapato-functional polysiloxanes are also known, and have been used in similar applications as amino-functional polysiloxanes. However, organopolysiloxanes containing both amino functional and mercapto functional groups in the same polymer have not been detailed in the art.

U.S. Pat. No. 5,344,906 describes a process for the production of an organosilicon condensation product which comprises contacting an organosilicon compound having at least one silanol group and wherein the silicon-bonded organic substituents can be hydrocarbon groups optionally substituted by amino, halogen, mercapto, hydroxyl, amido or ester substituents, with a quaternary ammonium phosphate, borate, carbonate or silicate. However, U.S. Pat. No. 5,344,906 does not detail the combination of an amino and mercapto group in the same polymer.

One of the major disadvantages of topical finishes prepared with fluorocarbon polymers is that they impart a harsh feel to the fabric surface. There is a need for textile treatment agents which impart oleophobicity and oil repellency to fabrics without imparting a harsh feel to the fabric surface, and preferably whilst at the same time imparting an improvement in feel compared to untreated fabric. The present inventors have discovered that organopolysiloxanes containing both an amino and mercapto functional group are useful to prepare fluorosilicones for the treatment of fabrics. The resulting treatment renders textiles oleophobic, but yet have improved hand or feel compared to other fluoro treatments.

SUMMARY

This invention relates to an amino-mercapto functional organopolysiloxane comprising siloxy units having the average formula;

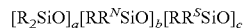

$[R_2SiO]_a[RR^NSiO]_b[RR^SSiO]_c$ where;
a is 1-4000, b is 1-1000, c is 1-1000,
R is independently a monovalent organic group,
$R^N$ is a monovalent amino functional organic group, and
$R^S$ is a monovalent mercapto functional organic group.

The invention further provides a method of making such amino-mercapto functional organopolysiloxanes by reacting:
(A) a silanol-functional polysiloxane,
(B) an amino functional alkoxy silane, and
(C) a mercapto functional alkoxy silane,
via a condensation reaction.

The amino-mercapto functional organopolysiloxanes products are useful in textile and fabric treatments. The amino-mercapto functional organopolysiloxanes are also useful as a reactant with fluorocarbons to prepare a fluorosilicone compounds for imparting oil repellent properties (oleophobicity) to the textile with improved hand.

DETAILED DESCRIPTION

The amino-mercapto functional organopolysiloxanes of the present invention are organopolysiloxanes having at least one mercapto functional organic group and at least one amino functional organic group present in the molecule. As used herein, a "mercapto functional organic group" is any organic group containing a sulfur atom. An "amino functional organic group is an organic group containing a nitrogen atom.

Organopolysiloxanes are polymers containing siloxane units independently selected from $(R_3SiO_{0.5})$, $(R_2SiO)$, $(RSiO_{1.5})$, or $(SiO_2)$ siloxy units, where R may be any monovalent organic group. When R is a methyl group in the $(R_3SiO_{0.5})$, $(R_2SiO)$, $(RSiO_{1.5})$, or $(SiO_2)$ siloxy units of an organopolysiloxane, the siloxy units are commonly referred to as M, D, T, and Q units respectively. These siloxy units can be combined in various manners to form cyclic, linear, or branched structures. The chemical and physical properties of the resulting polymeric structures can vary. For example organopolysiloxanes can be volatile or low viscosity fluids, high viscosity fluids/gums, elastomers or rubbers, and resins depending on the number and type of siloxy units in the average polymeric formula. R may be any monovalent organic group, alternatively R is a hydrocarbon group containing 1 to 30 carbons, alternatively R is an alkyl group containing 1 to 30 carbon atoms, or alternatively R is methyl.

The amino-mercapto functional organopolysiloxanes of the present invention are characterized by having at least one of the R groups in the formula $R_nSiO_{(4-n)/2}$ be a mercapto group, and at least one of the R groups be an amino group. The amino functional group and mercapto functional group may be present on any siloxy unit having an R substituent, that is, they may be present on any $(R_3SiO_{0.5})$, $(R_2SiO)$, or $(RSiO_{1.5})$ unit.

The amino-functional organic group is designated in the formulas herein as $R^N$ and is illustrated by groups having the formula; —$R^1NHR^2$, —$R^1NR_2^2$, or —$R^1NHR^1NHR^2$, wherein each $R^1$ is independently a divalent hydrocarbon group having at least 2 carbon atoms, and $R^2$ is hydrogen or an alkyl group. Each $R^1$ is typically an alkylene group having from 2 to 20 carbon atoms. $R^1$ is illustrated by groups such as; —CH$_2$CH$_2$—, —CH$_2$CH$_2$CH$_2$—, —CH$_2$CHCH$_3$—, —CH$_2$CH$_2$CH$_2$CH$_2$—, —CH$_2$CH(CH$_3$)CH$_2$—, —CH$_2$CH$_2$CH$_2$CH$_2$CH$_2$—, —CH$_2$CH$_2$CH$_2$CH$_2$CH$_2$CH$_2$—, —CH$_2$CH$_2$CH(CH$_2$CH$_3$)CH$_2$CH$_2$CH$_2$—, —CH$_2$CH$_2$CH$_2$CH$_2$CH$_2$CH$_2$CH$_2$—, and —CH$_2$CH$_2$CH$_2$CH$_2$CH$_2$CH$_2$CH$_2$CH$_2$CH$_2$—. The alkyl groups $R^2$ are as illustrated above for R. When $R^2$ is an alkyl group, it is typically methyl.

Some examples of suitable amino-functional hydrocarbon groups are; $-CH_2CH_2NH_2$, $-CH_2CH_2CH_2NH_2$, $-CH_2CHCH_3NH$, $-CH_2CH_2CH_2CH_2NH_2$, $-CH_2CH_2CH_2CH_2CH_2NH_2$, $-CH_2CH_2CH_2CH_2CH_2CH_2NH_2$, $-CH_2CH_2NHCH_3$, $-CH_2CH_2CH_2NHCH_3$, $-CH_2(CH_3)CHCH_2NHCH_3$, $-CH_2CH_2CH_2CH_2NHCH_3$, $-CH_2CH_2NHCH_2CH_2NH_2$, $-CH_2CH_2CH_2NHCH_2CH_2NH_2$, $-CH_2CH_2CH_2CH_2NHCH_2CH_2CH_2NH_2$, $-CH_2CH_2CH_2CH_2NHCH_2CH_2CH_2CH_2NH_2$, $-CH_2CH_2NHCH_2CH_2NHCH_3$, $-CH_2CH_2CH_2NHCH_2CH_2CH_2NHCH_3$, $-CH_2CH_2CH_2CH_2NHCH_2CH_2CH_2CH_2NHCH_3$, and $-CH_2CH_2NHCH_2CH_2NHCH_2CH_2CH_3$. Typically, the amino functional group is $-CH_2CH_2CH_2NH_2$.

The mercapto-functional organic group is designated in the formulas herein as $R^S$ and is illustrated by groups having the formula; $-R^1SR^2$, wherein each $R^1$ and $R^2$ is as defined above. The mercapto-functional group is illustrated by the following formulae; $CH_2CH_2CH_2SH$, $-CH_2CH(CH_3)SH$, $-CH_2CH_2CH_2CH_2SH$, $-CH_2CH_2CH_2CH_2CH_2SH$, $-CH_2CH_2CH_2CH_2CH_2CH_2SH$, $-CH_2CH_2SCH_3$. Typically, the mercapto functional group is $-CH_2CH_2CH_2SH$.

The amino-mercapto functional organopolysiloxane comprises siloxy units having the average formula;

$$[R_2SiO]_a[RR^NSiO]_b[RR^SSiO]_c$$

where;
a is 1-4000, alternatively 1 to 1000, alternatively 1 to 200,
b is 1-1000, alternatively 1 to 100, alternatively 1 to 50,
c is 1-1000, alternatively 1 to 100, alternatively 1 to 50;
R is independently a monovalent organic group,
  alternatively R is a hydrocarbon containing 1-30 carbon atoms,
  alternatively R is a monovalent alkyl group containing 1-12 carbons, or
  alternatively R is a methyl group;
$R^N$ is a monovalent amino functional organic group as defined above,
$R^S$ is a monovalent mercapto functional organic group as defined above.

The siloxy units in the formula $[R_2SiO]_a[RR^NSiO]_b[RR^SSiO]_c$ may be in any order, in other words, this formula does not imply any ordering of the designated siloxy units. Furthermore, the amino-mercapto organopolysiloxane may contain additional $(R_3SiO_{0.5})$, $(R_2SiO)$, $(RSiO_{1.5})$, or $(SiO_2)$ siloxy units. The amino-mercapto organopolysiloxane may be terminated with a hydrogen atom (resulting in a silanol group on the terminal siloxy unit of the terpolymer), or with an alkyl group containing 1-30 carbon atoms (resulting in an alkoxy group on the terminal siloxy unit of the terpolymer). When an alkyl group is used, the alkyl group can be a linear or branched alkyl, containing 1-30 carbons, alternatively the alkyl group can be a long chain alkyl group of 4-20, alternatively 8-20 carbon atoms such as stearyl. Alternatively, the organopolysiloxane can be terminated with a trialkylsilyl group such as a trimethylsilyl group.

Representative, non-limiting, examples of average formulae that may represent the amino-mercapto organopolysiloxanes of the present invention include;

$$HO-[(CH_3)_2SiO]_a[(CH_3)R^NSiO]_b[(CH_3)R^SSiO]_cH$$

$$(CH_3)_3SiO[(CH_3)_2SiO]_a[(CH_3)R^NSiO]_b[(CH_3)R^SSiO]_c Si(CH_3)_3$$

$$HO[(CH_3)_2SiO]_a[(CH_3)R^NSiO]_b[(CH_3)R^SSiO]_c [(CH_3)SiO_{1/2}]_dH$$

$$HO[(CH_3)_2SiO]_a[(CH_3)R^NSiO]_b[(CH_3)R^SSiO]_c [SiO_2]_e H$$

$$HO[(CH_3)_2SiO]_a[(CH_3)R^NSiO]_b[(CH_3)R^SSiO]_c [(CH_3)SiO_{1/2}]_d[SiO_2]_eH$$

$$(CH_3)_3SiO[(CH_3)_2SiO]_a[(CH_3)R^NSiO]_b[(CH_3)R^SSiO]_c [(CH_3)SiO_{1/2}]_d[SiO_2]_eSi(CH_3)_3$$

where;
a is 1-4000, alternatively 10 to 1000, alternatively 10 to 400,
b is 1-1000, alternatively 1 to 100, alternatively 1 to 50,
c is 1-1000, alternatively 1 to 100, alternatively 1 to 50;
d is 0-200, alternatively 1 to 100, alternatively 1 to 50;
e is 0-200, alternatively 1 to 100, alternatively 1 to 50;
and $R^N$ and $R^S$ are as defined above.

In one embodiment, the amino-mercapto organopolysiloxane may be represented by the following average formula example;

$$R'O(SiMe_2O)_a(SiMeO)_b(SiMeO)_cR'$$
with side groups $(CH_2)_3SH$ and $(CH_2)_3NH_2$ where;
a is 1-4000, alternatively 10 to 1000, alternatively 10 to 400,
b is 1-1000, alternatively 1 to 100, alternatively 1 to 50,
c is 1-1000, alternatively 1 to 100, alternatively 1 to 50;
and R' is H, an alkyl group having 1 to 40 carbon atoms, or $(CH_3)_3Si$.

The amino-mercapto functional organopolysiloxanes of the present invention may also contain additional organofunctional groups. As used herein, "organofunctional group" means an organic group containing any number of carbon atoms, but the group contains at least one atom other than carbon and hydrogen. Representative examples of such organofunctional groups include, amines, amides, sulfonamides, quaternaries, ethers, epoxy, phenols, esters, carboxyls, ketones, halogen substituted alkyls and aryls group.

The amino-mercapto functional organopolysiloxanes may be prepared by any technique known in the art for preparation of organopolysiloxane terpolymers that would provide both amino and mercapto functional groups in the same molecule. Preferably, the amino-mercapto organopolysiloxanes are prepared according to the methods of the present invention, as described below.

The amino-mercapto organopolysiloxanes of the present invention may be prepared by combining the components:
  (A) a silanol-functional polysiloxane,
  (B) an amino functional alkoxy silane, and
  (C) a mercapto functional alkoxy silane, and
optionally
  (D) an alcohol or monoalkoxysilane,
and initiating a condensation reaction among the components. The condensation reaction typically involves the addition of a condensation catalyst. The condensation catalyst may be selected from any silanol condensation catalyst known in the art, such as described in U.S. Pat. No. 3,160,601, or U.S. Pat. No. 5,344,906. Typically the condensation catalyst is a strong base, such as an alkaline metal hydroxide or a tin compound, used in combination with a phosphate, such as sodium orthophosphate. The catalyst may also be a quaternary ammonium salt or a carboxylic acid, a Lewis acid or Lewis base. The condensation catalyst is usually added at 0.0005 to 5% w/w, alternatively, 0.001 to 1% weight percent based on the total reaction components.

The silanol-functional organopolysiloxane useful as component (A) in the process of the present invention is an organopolysiloxane having Si—OH units in its molecule, typically at the termini positions of the siloxane polymer chain. The silanol-functional organopolysiloxane may be selected from polydiorganosiloxanes having the general formula;

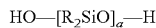
HO—[R$_2$SiO]$_a$—H where R is independently a monovalent organic group,
alternatively R is a hydrocarbon containing 1-30 carbon atoms,
alternatively R is a monovalent alkyl group containing 1-12 carbons, or
alternatively R is a methyl group,
and a is 1-4000, alternatively 10 to 1000, alternatively 10 to 400.

Exemplary of the silanol-functional organopolysiloxanes are silanol terminated polydimethylsiloxanes, HO—[(CH$_3$)$_2$SiO]$_a$—H, where a is as defined above.

Silanol-functional organopolysiloxane, and in particular, silanol terminated polydimethylsiloxanes are known in the art, and are commonly made from the hydrolysis of alkyl chloro silanes, such as dichloro, dimethyl silane.

The amino functional alkoxy silane (B) contains an amino-functional organic group and at least one alkoxy group bonded to Si in the molecule. The amino-functional organic group may be selected from any of the amino-functional organic groups described above, as represented by $R^N$. Thus, the amino functional alkoxy silane (B) may be selected from those silane compounds having the formula;

$R^3{}_hR^N{}_iSi(OR^4)_{[4-(h+i)]}$ where
h is 0, 1 or 2, i is 1 or 2, with the proviso that (h+i)≦3,
$R^3$ is a hydrocarbon group containing 1 to 30 carbon atoms,
$R^4$ is an alkyl group containing 1 20 carbon atoms.

Amino functional alkoxy silanes are known in the art, and many are available commercially.

Representative, non-limiting examples, of amino functional alkoxy silanes suitable a component (B) in the process of the present invention include;
(CH$_3$O)$_2$(CH$_3$)Si(CH$_2$)$_3$NH$_2$,
(CH$_3$O)$_2$(CH$_3$)Si(CH$_2$)$_4$NH$_2$,
(CH$_3$O)$_2$(CH$_3$)Si(CH$_2$)$_3$NH(CH$_2$)$_2$NH$_2$,
(CH$_3$O)$_2$(CH$_3$)SiCH$_2$CH(CH$_3$)CH$_2$NH(CH$_2$)$_2$NH$_2$,
(CH$_3$O)$_2$(CH$_3$)SiCH$_2$CH(CH$_3$)CH$_2$NH(CH$_2$)$_3$NH$_2$,
(CH$_3$O)$_2$(CH$_3$)Si(CH$_2$)$_3$NH(CH$_2$)$_2$NH(CH$_2$)$_2$NH$_2$,
(CH$_3$O)$_2$(CH$_3$)Si(CH$_2$)$_3$NH(CH$_2$)$_4$NH$_2$,
(CH$_3$O)$_2$(CH$_3$)Si(CH$_2$)$_3$O(CH$_2$)$_2$NH$_2$, and similar ethoxy (C$_2$H$_5$O) silanes.

The amino functional alkoxy silane (B) may also be a mixture of two or more independent amino functional alkoxy silanes as described above.

The mercapto functional alkoxy silane (C) contains an mercapto-functional organic group, and may be selected from any of the above mercapto functional organic groups, as designated above as $R^S$ above. Thus, the mercapto functional alkoxy silane (C) may be selected from those silane compounds having the formula;

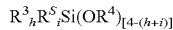
$R^3{}_hR^S{}_iSi(OR^4)_{[4-(h+i)]}$ where
h is 0, 1 or 2, i is 1 or 2, with the proviso that (h+i)≦3,
$R^S$ is a mercapto functional organic group as defined above,
$R^3$ is a hydrocarbon group containing 1 to 30 carbon atoms, $R^4$ is an alkyl group containing 1-20 carbon atoms.

Mercapto functional alkoxy silanes are known in the art, and many are available commercially.

Representative, non-limiting examples, of mercapto functional alkoxy silanes suitable a component (C) in the process of the present invention include;
(C$_2$H$_5$O)$_2$(CH$_3$)SiCH$_2$CH$_2$CH$_2$SH,
(C$_2$H$_5$O)$_2$(CH$_3$)SiCH$_2$CH(CH$_3$)SH,
(C$_2$H$_5$O)$_2$(CH$_3$)SiCH$_2$CH$_2$CH$_2$CH$_2$SH,
(C$_2$H$_5$O)$_2$(CH$_3$)SiCH$_2$CH$_2$CH$_2$CH$_2$CH$_2$SH,
(C$_2$H$_5$O)$_2$(CH$_3$)SiCH$_2$CH$_2$CH$_2$CH$_2$CH$_2$CH$_2$SH,
(C$_2$H$_5$O)$_2$(CH$_3$)SiCH$_2$CH$_2$SCH$_3$
(C$_2$H$_5$O)$_3$SiCH$_2$CH$_2$CH$_2$SH,
(C$_2$H$_5$O)$_3$SiCH$_2$CH(CH$_3$)SH,
(C$_2$H$_5$O)$_3$SiCH$_2$CH$_2$CH$_2$CH$_2$SH,
(C$_2$H$_5$O)$_3$SiCH$_2$CH$_2$CH$_2$CH$_2$CH$_2$SH,
(C$_2$H$_5$O)$_3$SiCH$_2$CH$_2$CH$_2$CH$_2$CH$_2$CH$_2$SH,
(C$_2$H$_5$O)$_3$SiCH$_2$CH$_2$SCH$_3$, and corresponding methoxy based silanes.

Optionally, an alcohol or monoalkoxysilane (D) is co-reacted with components (A), (B), and (C) with suitable catalysts. The alcohol tends to become incorporated in the organopolysiloxane as an end-blocking alkoxy group. Although not wishing to be bound by any theory, the present inventors believe the reaction between the alcohol group and Si—OH groups is much slower than that between Si-alkoxy groups and Si—OH groups, but is sufficiently fast that the alcohol acts as a modifier of molecular weight. In the absence of an alcohol or any other chain-stopping reagent, high molecular weight hydroxyl terminated amino-functional polysiloxanes are produced. The alcohol can be an aliphatic alcohol having 8 to 30 carbon atoms, for example n-octanol, n-decanol, octadecanol, cetyl alcohol or a commercial mixture of linear and branched 12-16 C alcohols. Such high molecular weight aliphatic alcohols are preferred when producing a clear liquid reaction product using an aliphatic carboxylic acid having 6 to 20 carbon atoms. Alternatively, the alcohol (D) may be an ether alcohol, for example 2-methoxypropanol or 2-butoxyethanol or a hydroxy-terminated polyether, for example a polyethoxylated fatty alcohol or a polypropylene glycol monoether.

Alternatively, a monoalkoxysilane ROSiR$_3$, where R is a monovalent organic group, may be co-reacted with the aminosilane (B), the silanol-functional polysiloxane (A), and the mercaptosilane (C) in the presence of a suitable catalyst. The R$_3$Si group becomes incorporated in the mercapto containing amino-functional polysiloxane as an end-blocking group.

The amounts of components (A), (B), (C), and optionally (D) may be varied to produce amino-mercapto functional organopolysiloxanes having a range of molecular weights and varying amounts of amino and mercapto functional groups present in the organopolysiloxane. As discussed above, the amount of (D) added controls the overall molecular weight or degree of polymerization of the amino-mercapto organopolysiloxane. Typically the molar amounts of components (A), (B), and (C) are selected such to provide a molar percentage of each to be;
(A) 1 to 99.5, alternatively 10 to 60, or alternatively 30 to 40,
(B) 0.5 to 60, alternatively 10 to 40, or alternatively 20 to 30,
(C) 0.5 to 60, alternatively 10 to 40, or alternatively 20 to 30,
where (A)+(B)+(C) sums to 100%.

The molar ratio of [(B)+(C)]/[(A)+(B)+(C)] may vary from 0.05 to 1, alternatively 0.5 to 1, or alternatively 0.9 to 1.

The reaction between the aminosilane (A), silanol-functional polysiloxane (B) and the mercaptosilane (C) may be carried out at any temperature in the range 0-200° C. Temperatures of at least 50° C. are preferred, most preferably from 60° C. up to 120 or 140° C. The reaction may be carried out at pressures in the range from 5 mbar up to 5 bar, for example at ambient pressure; it is frequently preferred that at least the later part of the reaction is carried out under reduced pressure, for example 10 to 400 mbar, particularly if there is a need to promote removal of volatile by-product from the reaction system.

The reaction between the aminosilane, silanol-functional polysiloxane and the mercaptosilane may be carried out undiluted in the liquid phase, since the polysiloxane (A) generally has a low enough viscosity to permit ready reaction. The reaction can alternatively be carried out in solution, dispersion or emulsion. Reaction in emulsion may be preferred if the amino-mercapto organopolysiloxane product is to be used in emulsion; textile treating agents such as fiber lubricants, softening agents and anti-wrinkle agents are often applied from emulsion.

In one preferred process, the reaction between the aminosilane (B), silanol-functional polysiloxane (A) and the mercaptosilane (C) are mixed with a surfactant and water to form an emulsion, and the condensation reaction between (A), (B) and (C) is carried out in the emulsion, thereby forming an emulsion of an amino-mercaptofunctional organopolysiloxane. The surfactant can for example be a nonionic, anionic or cationic surfactant, for example an ethoxylated alcohol or phenol nonionic surfactant. The amount of surfactant added can for example be at least 0.2% based on the total weight of aminosilane (B), silanol-functional polysiloxane (A) and the mercaptosilane (C), preferably at least 0.5%, for example from 2% up to 10 or 20%. Water is preferably added in two stages. The aminosilane (B), silanol-functional polysiloxane (A) and the mercaptosilane (C) are first mixed with a surfactant and a small amount of water to form a viscous oil in water emulsion ("thick phase"). The amount of water added at this stage is generally at least 0.5% based on the total weight of silanol-functional polysiloxane (A) and aminosilane (B) and mercaptosilane (C), preferably at least 1% up to 10 or 20%. Further water can subsequently be added, for example from 20 or 30% up to 100 or 200%, to form a diluted emulsion of suitable viscosity for carrying out the condensation reaction. In general it is preferred that the aminosilane (B), silanol-functional polysiloxane (A) and mercaptosilane (C), surfactant and water are mixed to from an emulsion at a low temperature, generally below 50° C., for example ambient temperature, and the emulsion is heated to a temperature in the range 50-200° C., preferably 60-140° C., to effect the condensation reaction.

The emulsion of amino-functional polysiloxane produced is generally of low particle size, for example less than 500 nm and frequently less than 300 nm. If the mixture of aminosilane (B), silanol-functional polysiloxane (A), and mercaptosilane (C) surfactant and water are acidified to a pH below 4, for example in the range 2 to 4 and preferably about pH3, it may be possible to form a microemulsion, that is an emulsion of particle size below 100 nm, for example 5 to 50 nm, which forms without need for vigorous mixing. Such a low pH can be achieved by use of a carboxylic acid of low pKa and/or by use of an acid-functional surfactant of low pKa.

The time of reaction can for example be from 10 minutes up to 24 hours. The reaction can be quenched after a desired time by adding water or an alcohol endblocker to the reagents, although quenching is not necessary. The alcohol endblocker can be selected from the alcohols described above as component (D). The reaction can be substantially slowed by removal of heat and if a modifier of molecular weight such as an alcohol is present an equilibrium will be reached. If water quenching is used, the product is a dispersion or emulsion in which the amino-functional polysiloxane is generally stably dispersed.

The reaction between the silanol-functional polysiloxane (A), aminosilane (B) and mercaptosilane (C) can if desired be carried out in the presence of a liquid organic or silicone non-reactive diluent. A preferred diluent is a non-reactive polysiloxane having a viscosity of less than 375 mPas, for example 5 to 100 mPa·s. Examples of such polysiloxanes include hexamethyldisiloxane, octamethyltrisiloxane, decamethyltetrasiloxane, dodecamethylpentasiloxane, tetradecamethylhexasiloxane or hexadecamethylheptasiloxane, octamethylcyclotetrasiloxane, decamethylcyclopentasiloxane or dodecamethylcyclohexasiloxane, heptamethyl-3-{(trimethylsilyl)oxy}-trisiloxane (M3T), hexamethyl-3,3,bis{(trimethylsilyl)oxy}trisiloxane (M4Q) or pentamethyl{(trimethylsilyl)oxy}cyclotrisiloxane, or a non-reactive, for example trimethylsilyl-terminated, polydimethylsiloxane. Cyclic polysiloxanes having at least 5 silicon atoms, especially decamethylcyclopentasiloxane (D5), are particularly preferred.

The liquid organic or silicone non-reactive diluent can be present from the start of the reaction or can be added during the reaction. Use of the non-reactive diluent allows the production of easily handled compositions containing amino-mercapto functional organopolysiloxanes of high molecular weight and high viscosity. Amino-mercapto functional organopolysiloxanes of viscosity above 10 Pa·s, preferably above 20 Pa·s, and up to 100 Pa·s or more can be prepared as solutions or dispersions of viscosity suitable for application in textiles. Where the non-reactive diluent is a silicone, the product is generally a solution of the amino-mercapto functional organopolysiloxane. These high viscosity amino-mercapto functional organopolysiloxanes are particularly effective in conditioning as fiber lubricants. When producing high molecular weight amino-mercapto functional organopolysiloxanes, it may be preferred to remove some reagent during the later stages of preparation. For example, the silanol-functional polysiloxane (A), aminosilane (B) and meracptopropylsilane (C) can initially be reacted in the presence of an alcohol which acts as a chain terminating agent. A silicone non-reactive diluent can be added during the reaction. The reaction can then be continued to increase the chain length of the amino-mercapto functional organopolysiloxane. Such continued reaction can for example be at increased temperature and/or reduced pressure to promote removal of the alcohol. The amount of liquid organic or silicone non-reactive diluent present can for example be from 10 to 2000%, preferably 20 to 500% by weight based on the total weight of aminosilane (A) and silanol-functional polysiloxane (B) and mercaptosilane (C). The resulting solution of amino-mercapto functional organopolysiloxane in non-reactive diluent can be further diluted for use if required.

A representative condensation polymerization reaction useful to prepare the amino-mercapto organopolysiloxanes of the present invention may be illustrated by the following general reaction scheme.

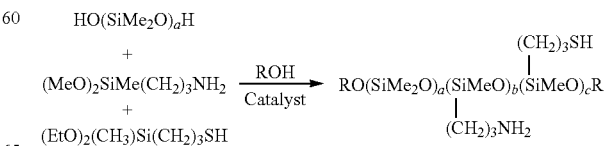

where a, b, and c are as defined above.

The amino-mercapto functional organopolysiloxane can be chemically modified by reaction after it has been formed. Such modifications are known for example in preparing textile treatment agents. It can for example be reacted with a lactone, particularly a lactone of an omega-hydroxy carboxylic acid having 3 to 8 ring carbon atoms such as epsilon-caprolactone or gamma-butyrolactone, under the conditions described in U.S. Pat. No. 5,824,814, to form a polymer having hydroxyamide groups of the formula —N—C(O)—$(CH_2)_x$—OH, where x is 2 to 7. The mercapto amino-functional polysiloxane can be reacted with an epoxide to form a polymer containing beta-hydroxyamine groups, for example with ethylene oxide to form —NH—$CH_2CH_2$OH groups as described in U.S. Pat. No. 5,352,817 or with glycidol to form —NH—CH($CH_2$OH)$_2$ groups. Alternatively it can be reacted with an acrylate or other activated C=C bond in a Michael-type addition, for example with hydroxyethyl acrylate to form —NH—$CH_2$—$CH_2$—COO—$C_2H_4$OH groups. The mercapto amino-functional polysiloxane can be quaternised by reaction with an alkylating agent such as dimethyl sulphate as described in U.S. Pat. No. 5,164,522. The mercapto amino-functional siloxane can also be used to as a chain transfer agent in the polymerization reaction of a substituted ester of an ethylenically unsaturated carboxylic acid. The amino-mercapto functional organopolysiloxanes are also useful as a reactant with fluorocarbons to prepare a fluorosilicone compounds for imparting oil repellent properties (oleophobicity) to the textile with improved hand.

EXAMPLES

The following examples are presented to further illustrate the compositions and methods of this invention, but are not to be construed as limiting the invention. All parts and percentages in the examples are on a weight basis and all measurements were obtained at about 23° C., unless indicated to the contrary.

Example 1

Silanol terminated polydimethylsiloxanes, [HO($SiMe_2$O)$_{\sim 40}$H] (95.6 g) and [HO($SiMe_2$O)$_{\sim 12}$H] (32.5 g) were charged to a reaction vessel followed by aminopropylmethyl dimethoxysilane (4.8 g) and mercaptopropylmethyl diethoxysilane (4.4 g). To the reaction mixture was then added barium hydroxide (0.72 g) and sodium orthophosphate (0.23 g). The reaction vessel was then heated to 80° C. and held at this temperature for three hours after which the reaction mixture was placed under reduced pressure (200 mbar) for several hours after which a linear aliphatic C13 alcohol (10.5 g) was added and the reaction maintained at 80° C. and atmospheric pressure for a further two hours to yield a siloxane terpolymer of viscosity 1,050 Cp. The polymer was then filtered to remove the catalyst and stored under nitrogen.

Example 2

Silanol terminated polydimethylsiloxanes, [HO($SiMe_2$O)$_{\sim 40}$H] (95.8 g) and [HO($SiMe_2$O)$_{\sim 12}$H] (32.9 g) were charged to a reaction vessel followed by aminopropylmethyl dimethoxysilane (4.2 g) and mercaptopropylmethyl diethoxysilane (4.8 g). To the reaction mixture was then added barium hydroxide (0.68 g) and sodium orthophosphate (0.23 g). The reaction vessel was then heated to 80° C. and held at this temperature for three hours after which the reaction mixture was placed under reduced pressure (200 mbar) for several hours after which a linear aliphatic C13 alcohol (10.9 g) was added and the reaction maintained at 80° C. and atmospheric pressure for a further two hours to yield a siloxane terpolymer of viscosity 2,160 Cp. The polymer was then filtered to remove the catalyst and stored under nitrogen.

Example 3

Silanol terminated polydimethylsiloxanes, [HO($SiMe_2$O)$_{\sim 40}$H] (94.3 g) and [HO($SiMe_2$O)$_{\sim 12}$H] (31.5 g) were charged to a reaction vessel followed by aminopropylmethyl dimethoxysilane (4.9 g) and mercaptopropylmethyl diethoxysilane (4.1 g). To the reaction mixture was then added barium hydroxide 0.70 g and sodium orthophosphate (0.26 g). The reaction vessel was then heated to 80° C. and held at this temperature for three hours after which the reaction mixture was placed under reduced pressure (200 mbar) for several hours after which a linear aliphatic C13 alcohol (10.1 g) was added and the reaction maintained at 80° C. and atmospheric pressure for a further two hours to yield a siloxane terpolymer of viscosity 4,380 Cp. The polymer was then filtered to remove the catalyst and stored under nitrogen.

Example 4

A silanol terminated polydimethylsiloxane, [HO($SiMe_2$O)$_{\sim 12}$H] (681 g), was charged to a reaction vessel followed by aminopropylmethyl dimethoxysilane (20.25 g), mercaptopropylmethyl diethoxysilane (17.25 g) and trimethylethoxysilane (31.5 g). To the reaction mixture was then added barium hydroxide (0.47 g) and sodium orthophosphate (0.19 g). The reaction vessel was heated to 70° C. and held at this temperature for three hours after which the reaction temperature was increased to 85° C. and the mixture was placed under reduced pressure (200 mbar) for several hours. The reaction temperature was then reduced to 70° C. and trimethylethoxysilane (50 g) was added. The reaction was maintained at atmospheric pressure for a further three hours before it was placed under reduced pressure (50 mbar) for 30 minutes to yield a siloxane terpolymer of viscosity 554 cP. The polymer was filtered to remove the catalyst and additional trimethylethoxysilane (1 wt %) was added to the product, which was stored under nitrogen.

Example 5

A silanol terminated polydimethylsiloxane, [HO($SiMe_2$O)$_{\sim 12}$H] (625.1 g), was charged to a reaction vessel followed by aminopropylmethyl dimethoxysilane (20.7 g), mercaptopropylmethyl diethoxysilane (88.1 g) and trimethylethoxysilane (16.1 g). To the reaction mixture was then added barium hydroxide (0.5 g) and sodium orthophosphate (0.2 g). The reaction vessel was heated to 70° C. and held at this temperature for three hours after which the reaction temperature was increased to 85° C. and the mixture was placed under reduced pressure (50 mbar) for several hours. The reaction temperature was then reduced to 70° C. and trimethylethoxysilane (50 g) was added. The reaction was maintained at atmospheric pressure for one hour before it was placed under reduced pressure (50 mbar) for 30 minutes to yield a siloxane terpolymer of viscosity 554 cP. The polymer was filtered to remove the catalyst and was stored under nitrogen.

Example 6

A silanol terminated polydimethylsiloxane, [HO($SiMe_2$O)$_{\sim 4}$H] (625.1 g), was charged to a reaction vessel followed by aminopropylmethyl dimethoxysilane (20.7 g), mercaptopropylmethyl diethoxysilane (88.1 g) and trimethylethoxysilane (16.1 g). To the reaction mixture was then added barium hydroxide (0.5 g) and sodium orthophosphate (0.2 g). The reaction vessel was heated to 70° C. and held at this temperature for three hours after which the reaction temperature was increased to 85° C. and the mixture was placed under reduced pressure (50 mbar) for several hours. The reaction temperature was then reduced to 70° C. and trimethylethoxysilane (50 g) was added. The reaction was maintained at atmospheric pressure for one hour before it was placed under reduced pressure (50 mbar) for 30 minutes to yield a siloxane terpolymer of viscosity 168 cP. The polymer was filtered to remove the catalyst and was stored under nitrogen

Example 7

A silanol terminated polydimethylsiloxane, [HO(SiMe$_2$O)$_{-12}$H] (881 g), was charged to a reaction vessel followed by aminopropylmethyl dimethoxysilane (54 g), mercaptopropylmethyl diethoxysilane (23 g) and trimethylethoxysilane (61 g). To the reaction mixture was then added barium hydroxide (0.63 g) and sodium orthophosphate (0.25 g). The reaction vessel was heated to 70° C. and held at this temperature for three hours after which the reaction temperature was increased to 85° C. and the mixture was placed under reduced pressure (50 mbar) for several hours. The reaction temperature was then reduced to 70° C. and trimethylethoxysilane (50 g) was added. The reaction was maintained at atmospheric pressure for a further three hours before it was placed under reduced pressure (50 mbar) for 30 minutes to yield a siloxane terpolymer of viscosity 352 cP. The polymer was filtered to remove the catalyst and additional trimethylethoxysilane (1 wt %) was added to the product, which was stored under nitrogen.

Example 8

A silanol terminated polydimethylsiloxane, [HO(SiMe$_2$O)$_{-4}$H] (600 g), was charged to a reaction vessel followed by aminopropylmethyl dimethoxysilane (101.25 g), mercaptopropylmethyl diethoxysilane (17.25 g) and trimethylethoxysilane (31.5 g). To the reaction mixture was then added barium hydroxide (0.5 g) and sodium orthophosphate (0.2 g). The reaction vessel was heated to 70° C. and held at this temperature for three hours after which the reaction temperature was increased to 85° C. and the mixture was placed under reduced pressure (50 mbar) for several hours. The reaction temperature was then reduced to 70° C. and trimethylethoxysilane (50 g) was added. The reaction was maintained at atmospheric pressure for one hour before it was placed under reduced pressure (50 mbar) for 30 minutes to yield a siloxane terpolymer of viscosity 132 cP. The polymer was filtered to remove the catalyst and was stored under nitrogen

Example 9

A silanol terminated polydimethylsiloxane, [HO(SiMe$_2$O)$_{-4}$H] (431 g), was charged to a reaction vessel followed by aminopropylmethyl dimethoxysilane (175 g), mercaptopropylmethyl diethoxysilane (14.9 g) and trimethylethoxysilane (27.2 g). To the reaction mixture was then added barium hydroxide (0.44 g) and sodium orthophosphate (0.18 g). The reaction vessel was heated to 70° C. and held at this temperature for three hours after which the reaction temperature was increased to 85° C. and the mixture was placed under reduced pressure (50 mbar) for several hours. The reaction temperature was then reduced to 70° C. and trimethylethoxysilane (50 g) was added. The reaction was maintained at atmospheric pressure for one hour before it was placed under reduced pressure (50 mbar) for 30 minutes to yield a siloxane terpolymer of viscosity 55 cP. The polymer was filtered to remove the catalyst and was stored under nitrogen

Example 10

An amino-functional siloxane terpolymer, Example 1, (30.5 g), stearyl acrylate (10.2 g), fluoromonomer $CH_2=CHCO_2(CH_2)_2C_8F_{17}$ (60.7 g) and butyl acetate (201 g) were charged to a reaction vessel after which 1,1'-azo-bis-cyclohexanecarbonitrile (0.62 g) was added. The reaction mixture was then heated to 90° C. and held at this temperature for eight hours to yield a solution of a soft water and oil repellent polymer. The resulting solution was then diluted with butylacetate to yield a solution containing 2% w/w polymer. The resulting solution was then applied to a range of fabrics. The solution was applied to the fabric (6 cm×6 cm piece) to give 100% wet pick up. The fabrics were then air dried for 24 hours and then heat cured at 150° C. for three minutes.

Example 11

An amino-functional siloxane terpolymer, Example 2, (28.7 g), stearyl acrylate (9.5 g), fluoromonomer $CH_2=CHCO_2(CH_2)_2C_8F_{17}$ (62.5 g) and butyl acetate (205 g) were charged to a reaction vessel after which 1,1'-azo-bis-cyclohexanecarbonitrile (0.58 g) was added. The reaction mixture was then heated to 90° C. and held at this temperature for eight hours to yield a solution of a soft water and oil repellent polymer. The resulting solution was then diluted with butyl acetate to yield a solution containing 2% w/w polymer. The resulting solution was then applied to a range of fabrics. The solution was applied to the fabric (6 cm×6 cm piece) to give 100% wet pick up. The fabrics were then air dried for 24 hours and then heat cured at 150° C. for three minutes.

Example 12

An amino-functional siloxane terpolymer, Example 3, (27.6 g), stearyl acrylate (11.2 g), fluoromonomer $CH_2=CHCO_2(CH_2)_2C_8F_{17}$ [FA] (59.5 g) and butyl acetate (208 g) were charged to a reaction vessel after which 1,1'-azo-bis-cyclohexanecarbonitrile (0.58 g) was added. The reaction mixture was then heated to 90° C. and held at this temperature for eight hours to yield a solution of a soft water and oil repellent polymer. The resulting solution was then diluted with butyl acetate to yield a solution containing 2% w/w polymer. The resulting solution was then applied to a range of fabrics. The solution was applied to the fabric (6 cm×6 cm piece) to give 100% wet pick up. The fabrics were then air dried for 24 hours and then heat cured at 150° C. for three minutes.

Comparative Example

Fluoromonomer $CH_2=CHCOO(CH_2)_2C_8F_{17}$ (60.5 g), stearyl acrylate (30.3 g), dodecanethiol (1.05 g), butyl acetate (190 g) and, 1,1'-azo-bis-cyclohexanecarbonitrile (0.61 g) were charged to a reaction vessel and heated to 90° C. and held for eight hours to yield a reference oil and water repellent fluorocarbon polymer.

The oil and water repellency and hand of the fabrics were evaluated and the results are shown in Tables 1 to 4 below.

Test Methods

The oil repellency of the treated fabrics was evaluated using AATCC test method 118-1997. The water repellency of the treated fabrics was evaluated using the spray test method, AATCC 22-1996.

Water repellency was also measured by the IPA/water test, in which various solutions water/isopropanol having ratios by volume comprised from 100/0 to 0/100 as reported in the table below.

| Solution H$_2$O/IPA (vol/vol) | Water repellency Index |
|---|---|
| 100/0 | 0 |
| 90/10 | 1 |
| 80/20 | 2 |
| 70/30 | 3 |
| 60/40 | 4 |
| 50/50 | 5 |
| 40/60 | 6 |
| 30/70 | 7 |
| 20/80 | 8 |
| 10/90 | 9 |
| 0/100 | 10 |

Four drops with a diameter of approximately 3 mm of the isopropanol/water solution are deposited on a sample of treated fabric. The behaviour of the four drops is observed for a time of 30 seconds. If three out of the four drops show no absorption or darkening of the fabric then one moves to the next solution with a higher content of isopropanol. The water repellency index/rating relates to the last test solution that did not absorb into or darken the fabric surface. The handle of the treated cotton fabrics was assessed on a scale of 1 to 10, where 1=harsh, 10=very soft

TABLE 1

Results for oil repellency

| Sample | Cotton | Cotton/Polyester | Polyester | Nylon |
|---|---|---|---|---|
| Example 1 | 5 | 5 | 6 | 5 |
| Example 2 | 5 | 5 | 6 | 6 |
| Example 3 | 5 | 6 | 6 | 6 |
| Control | 5 | 5 | 6 | 6 |

The results in Table 1 shows that the oil repellency of fabrics treated with the fluorosilicone hybrid polymeric reaction products of the invention is as good as fabrics treated with the control fluorocarbon polymer.

TABLE 2

Results for water repellency spray test.

| Sample | Cotton | Cotton/Polyester | Polyester | Nylon |
|---|---|---|---|---|
| Example 1 | 80 | 80 | 90 | 100 |
| Example 2 | 80 | 90 | 90 | 100 |
| Example 3 | 80 | 90 | 90 | 100 |
| Control | 80 | 90 | 90 | 100 |

TABLE 3

Results for IPA/water test

| Sample | Cotton | Cotton/Polyester | Polyester | Nylon |
|---|---|---|---|---|
| Example 1 | 8 | 9 | 9 | 9 |
| Example 2 | 8 | 9 | 9 | 9 |

TABLE 3-continued

Results for IPA/water test

| Sample | Cotton | Cotton/Polyester | Polyester | Nylon |
|---|---|---|---|---|
| Example 3 | 8 | 9 | 9 | 9 |
| Control | 9 | 9 | 9 | 9 |

The data in Tables 2 and 3 show that the water repellency of fabrics treated with the fluorosilicone hybrid polymeric reaction products of the invention is good as fabrics treated with the control fluorocarbon polymer.

TABLE 4

Handle Evaluation

| Sample | Handle |
|---|---|
| Example 1 | 6 |
| Example 2 | 6 |
| Example 3 | 7 |
| Control | 2 |

The data in Table 4 shows that the handle of fabrics treated with the fluorosilicone polymeric reaction product is much softer than fabrics treated with the control fluorocarbon polymer alone.

The invention claimed is:

1. A process for the preparation of an amino-mercapto functional polysiloxane consisting of reacting:
   (A) 1 to 80 mol % of a silanol-functional polysiloxane,
   (B) 10 to 60 mol % of an amino functional alkoxy silane, and
   (C) 10 to 60 mol % of a mercapto functional alkoxy silane,
where (A)+(B)+(C) sums to 100%, and optionally
   (D) an alcohol or monoalkoxysilane,
via a condensation reaction.

2. The process of claim 1 wherein the silanol functional polysiloxane is a polydiorganosiloxane having the general formula;

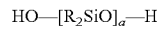

HO—[R$_2$SiO]$_a$—H where R is independently a monovalent organic group and a is 1-4000.

3. The process of claim 1 wherein the amino functional alkoxy silane has the formula

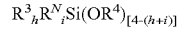

$R^3_h R^N_i Si(OR^4)_{[4-(h+i)]}$ where
   h is 0, 1 or 2, i is 1 or 2, with the proviso that (h+i)≦3,
   $R^N$ is an amino functional organic group,
   $R^3$ is a hydrocarbon group containing 1 to 30 carbon atoms,
   $R^4$ is an alkyl group containing 1-20 carbon atoms.

4. The process of claim 1 wherein the amino functional alkoxy silane is selected from;
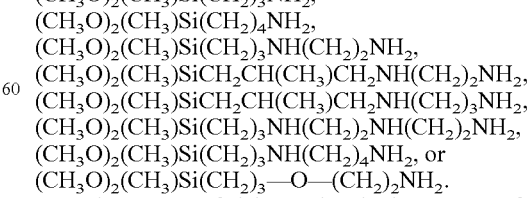
(CH$_3$O)$_2$(CH$_3$)Si(CH$_2$)$_3$NH$_2$,
(CH$_3$O)$_2$(CH$_3$)Si(CH$_2$)$_4$NH$_2$,
(CH$_3$O)$_2$(CH$_3$)Si(CH$_2$)$_3$NH(CH$_2$)$_2$NH$_2$,
(CH$_3$O)$_2$(CH$_3$)SiCH$_2$CH(CH$_3$)CH$_2$NH(CH$_2$)$_2$NH$_2$,
(CH$_3$O)$_2$(CH$_3$)SiCH$_2$CH(CH$_3$)CH$_2$NH(CH$_2$)$_3$NH$_2$,
(CH$_3$O)$_2$(CH$_3$)Si(CH$_2$)$_3$NH(CH$_2$)$_2$NH(CH$_2$)$_2$NH$_2$,
(CH$_3$O)$_2$(CH$_3$)Si(CH$_2$)$_3$NH(CH$_2$)$_4$NH$_2$, or
(CH$_3$O)$_2$(CH$_3$)Si(CH$_2$)$_3$—O—(CH$_2$)$_2$NH$_2$.

5. The process of claim 1 wherein the mercapto functional alkoxy silane has the formula;

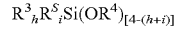

$R^3_h R^S_i Si(OR^4)_{[4-(h+i)]}$ where
- h is 0, 1 or 2, i is 1 or 2, with the proviso that (h+i)≦3,
- $R^S$ is a mercapto functional organic group,
- $R^3$ is a hydrocarbon group containing 1 to 30 carbon atoms,
- $R^4$ is an alkyl group containing 1-20 carbon atoms.

6. The process of claim 1 wherein the mercapto functional silane is selected from
$(C_2H_5O)_2(CH_3)SiCH_2CH_2CH_2SH$,
$(C_2H_5O)_2(CH_3)SiCH_2CH(CH_3)SH$,
$(C_2H_5O)_2(CH_3)SiCH_2CH_2CH_2CH_2SH$,
$(C_2H_5O)_2(CH_3)SiCH_2CH_2CH_2CH_2CH_2SH$,
$(C_2H_5O)_2(CH_3)SiCH_2CH_2CH_2CH_2CH_2CH_2SH$,
$(C_2H_5O)_2(CH_3)SiCH_2CH_2SCH_3$
$(C_2H_5O)_3SiCH_2CH_2CH_2SH$,
$(C_2H_5O)_3SiCH_2CH(CH_3)SH$,
$(C_2H_5O)_3SiCH_2CH_2CH_2CH_2SH$,
$(C_2H_5O)_3SiCH_2CH_2CH_2CH_2CH_2SH$,
$(C_2H_5O)_3SiCH_2CH_2CH_2CH_2CH_2CH_2SH$, or
$(C_2H_5O)_3SiCH_2CH_2SCH_3$.

* * * * *